US008516499B2

(12) United States Patent
Akiyama et al.

(10) Patent No.: US 8,516,499 B2
(45) Date of Patent: Aug. 20, 2013

(54) ASSISTANCE IN PERFORMING ACTION RESPONSIVE TO DETECTED EVENT

(75) Inventors: Kazuhito Akiyama, Tokyo (JP); Yasutaka Nishimura, Kanagawa-ken (JP); Tadashi Tsumura, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 12/622,455

(22) Filed: Nov. 20, 2009

(65) Prior Publication Data

US 2010/0131952 A1    May 27, 2010

(30) Foreign Application Priority Data

Nov. 27, 2008   (JP) .................................. 2008-302673

(51) Int. Cl.
*G06F 9/46*  (2006.01)
*G06F 3/00*  (2006.01)
*G06F 9/44*  (2006.01)
*G06F 13/00* (2006.01)

(52) U.S. Cl.
USPC ........... 719/313; 718/100; 719/311; 719/318; 719/328

(58) Field of Classification Search
None
See application file for complete search history.

(56) References Cited

U.S. PATENT DOCUMENTS

| | | | |
|---|---|---|---|
| 5,692,156 A | 11/1997 | Bahls et al. | |
| 6,049,776 A | 4/2000 | Donnelly et al. | |
| 6,189,141 B1 | 2/2001 | Benitez et al. | |
| 6,535,110 B1 * | 3/2003 | Arora et al. ................ | 340/12.32 |
| 7,210,148 B2 | 4/2007 | Arnold et al. | |
| 7,330,694 B2 | 2/2008 | Lee et al. | |
| 7,389,453 B2 | 6/2008 | Udell | |
| 7,506,195 B2 | 3/2009 | Takahashi et al. | |

(Continued)

FOREIGN PATENT DOCUMENTS

JP    2007282089 A    10/1995
JP      08331125 A    12/1996

(Continued)

OTHER PUBLICATIONS

Biazetti et al., "Realizing Compound Event Processing Using Active Correlation Technology" IBM, Nov. 2005, 10 pages.

(Continued)

*Primary Examiner* — Emerson Puente
*Assistant Examiner* — Jonathan R Labud
(74) *Attorney, Agent, or Firm* — Yee & Associates, P.C.; Jeffrey S. LaBaw

(57) ABSTRACT

Assistance in performing an action for a detected event for a monitoring target resource whose connection is not an always-on connection to perform an appropriate action as soon as possible in response to occurrence of a failure. The assistance device stores, in association with an occurrence pattern of an event, information related to plural tasks for determining whether a predetermined condition is fulfilled, and an action to be performed by a corresponding device. Then, the assistance device calculates an index value for determining the level of probability of the occurrence pattern of the event, determines whether the calculated index value is larger than a predetermined value, and sends, to a device to perform the action, the occurrence pattern of the event the index value of which is determined to be larger than the predetermined value, and information related to the plural tasks and the action corresponding to the occurrence pattern.

16 Claims, 13 Drawing Sheets

(56) References Cited

U.S. PATENT DOCUMENTS

| | | | |
|---|---|---|---|
| 7,506,212 B2 | 3/2009 | Ramamurthy et al. | |
| 7,992,053 B2 | 8/2011 | Akiyama et al. | |
| 8,108,711 B2 | 1/2012 | Meijer et al. | |
| 8,145,449 B2 | 3/2012 | Shimada et al. | |
| 2002/0083018 A1* | 6/2002 | Carroll et al. | 705/401 |
| 2003/0140133 A1* | 7/2003 | Huntley et al. | 709/223 |
| 2005/0078660 A1 | 4/2005 | Wood | |
| 2005/0096797 A1* | 5/2005 | Matsubara et al. | 700/291 |
| 2005/0102312 A1 | 5/2005 | Ohya | |
| 2006/0206900 A1 | 9/2006 | Ooyama et al. | |
| 2007/0088914 A1 | 4/2007 | Soman et al. | |
| 2008/0183307 A1* | 7/2008 | Clayton et al. | 700/8 |
| 2008/0320495 A1 | 12/2008 | Akiyama et al. | |
| 2009/0172034 A1 | 7/2009 | Aoyama et al. | |
| 2009/0249428 A1* | 10/2009 | White et al. | 725/133 |
| 2010/0217837 A1* | 8/2010 | Ansari et al. | 709/218 |

FOREIGN PATENT DOCUMENTS

| | | |
|---|---|---|
| JP | 09265460 A | 10/1997 |
| JP | 10269252 A | 10/1998 |
| JP | 10334058 A | 12/1998 |
| JP | 11224214 A | 8/1999 |
| JP | 2000137627 A | 5/2000 |
| JP | 2000330912 A | 11/2000 |
| JP | 2001101108 A | 4/2001 |
| JP | 2002049486 A | 2/2002 |
| JP | 2003296129 A | 10/2003 |
| JP | 2003345622 A | 12/2003 |
| JP | 2005182364 A | 7/2005 |
| JP | 2005222216 A | 8/2005 |
| JP | 2005251207 A | 9/2005 |
| JP | 2006209206 A | 8/2006 |
| JP | 2006261804 A | 9/2006 |
| JP | 2007047988 A | 2/2007 |
| WO | 2006095506 A1 | 9/2006 |

OTHER PUBLICATIONS

"What is Autonomic Computing?", NIWS Corp., First Edition, Softbank Publishing Inc., Feb. 2005, 32 pages.

PCT search report dated Oct. 28, 2010 regarding application PCT/JP2009/069324, filing date Nov. 13, 2009, applicant's reference JP20080282, applicant International Business Machines Incorporated, 4 pages.

PCT search report dated Jun. 21, 2011 regarding application PCT/JP2009/068602, filing date Oct. 29, 2009, applicant's reference JP920080237, applicant International Business Machines Incorporated, 7 pages.

Final office action dated May 9, 2012 regarding U.S. Appl. No. 12/133,516, 37 pages.

Final office action dated Dec. 16, 2010 regarding U.S. Appl. No. 12/137,581, 8 pages.

Non-final office action dated Dec. 21, 2011 regarding U.S. Appl. No. 12/133,516, 23 pages.

Non-final office action dated Jul. 12, 2010 regarding U.S. Appl. No. 12/137,581, 10 pages.

Notice of allowance dated Mar. 24, 2011 regarding U.S. Appl. No. 12/137,581, 8 pages.

"Winny Leak—They are still out of tricks," Ideals and Realities of the Takenaka Colloquium, Business Netowrking Magazine, Nikkei Communications, Jun. 2006, 4 pages.

"Automatic Computing," Even Now, the Evolution Continues, Technology Focus, Computer World, Feb. 2007, 13 pages.

"An Architectural Blueprint for Automatic Computing", Autonomic Computing White Pages, G507-2065-00, IBM Corporation, Fourth Edition, Jun. 2006, 37 pages.

Kohei Ariga, "Web2.0 Hatsu 'Apuri no Tamago' no Tsukaikata", Solution IT, vol. 19, No. 6, Jun. 1, 2006, p. 26.

* cited by examiner (a)

| EVENT SEQUENCE OCCURRING BEFORE ACTION | ACTION THAT OCCURRED |
|---|---|
| $e_1, e_2, e_3$ | $A_1$ |
| $e_2, e_3, e_1, e_5$ | $A_2$ |
| $e_3, e_1, e_2$ | $A_3$ |
| $e_2, e_1, e_2, e_3$ | $A_4$ |

(b)

| APPEARANCE PATTERN | FREQUENCY | ACTION CONTAINED (NUMBER OF OCCURRENCES) |
|---|---|---|
| $e_2, e_3$ | 0.95 | $A_1(12), A_2(1),$ |
| $e_1, e_2$ | 0.54 | $A_1(5), A_3(4),$ |
| $e_3, e_1, e_2$ | 0.34 | $A_3(4)$ |

FIG. 13

ASSISTANCE IN PERFORMING ACTION RESPONSIVE TO DETECTED EVENT

FIELD OF THE INVENTION

The present invention relates to a system for assistance in performing an action for a detected event, a method of providing assistance in performing an action for a detected event, an assistance device, and a computer program, capable of performing the action for the detected event without delay even if occurrence of events is detected on a periodic basis.

BACKGROUND OF THE INVENTION

With the rapid development of computer technology in recent years, computer systems are naturally incorporated in backbone systems constructing a social infrastructure. In order to operate the social infrastructure normally at all times, considerable operation costs are required. An autonomic computing system has attracted attention as a technique for reducing the operation costs as much as possible and increasing the degree of system stability.

The autonomic computing system is a generic term describing technology for constructing a system-scale, self-contained environment, where the autonomic computing section is a part of an entire system for detecting a problem or failure that arises in a system and autonomously controlling the operation. For example, various methods for monitoring an event corresponding to a problem or failure that arises in a system are disclosed as follows.

Japanese Patent Application Publication No. 10-91482 discloses an object monitoring method, which actuates a monitoring object for monitoring occurrence of an event such as a failure for each of plural nodes to be monitored, and sends event occurrence information to a management node as necessary. Japanese Patent Application Publication No. 2005-285040 discloses a network monitoring system for collecting continuous quantity information of network devices to be monitored, and collecting monitoring information from a network device that has detected an abnormal behavior to specify the cause of a failure.] Japanese Patent Application Publication No. 2004-110790 discloses an autonomic server farm for detecting occurrence of a failure in a server managing plural nodes and providing self-healing of the failure.

SUMMARY OF THE INVENTION

In a first aspect of the present invention, there is a provided a system for assistance in performing an action for a detected event, in which an assistance device is connected to a plurality of devices in such a manner to enable data communication with the plural devices. In this system, the assistance device comprises: a storage unit for storing, in association with an occurrence pattern of an event, information related to plural tasks for determining whether a predetermined condition is fulfilled, and an action to be performed by a corresponding device; index value calculating section for calculating an index value for determining the level of probability of the occurrence pattern of the event; determination section for determining whether the calculated index value is larger than a predetermined value; and sending section for sending, to the device to perform the action, the occurrence pattern of the event the index value of which is determined by the determination section to be larger than the predetermined value, and information related to the plural tasks and the action corresponding to the occurrence pattern.

In a second aspect of the present invention, the sending section sends, to the device to perform the action, information about the time to erase the occurrence pattern of the event and the information related to the plural tasks and the action corresponding to the occurrence pattern.

In a third aspect of the present invention, the index value calculating section includes: condition determination section for determining whether each task fulfills a predetermined condition; and counting section for counting the number of tasks determined by the condition determination section not to fulfill the predetermined condition, and the determination section includes task count determining section for determining whether the number of tasks counted by the counting section is smaller than a predetermined value.

In a fourth aspect of the present invention, the index value calculating section includes event sequence extracting section for extracting plural event sequences that occur within a given time period starting at a predetermined time, pattern acquiring section for acquiring, for each appearance pattern of an event, the frequency of appearance of the appearance pattern and the number of occurrences of each action containing the occurrence pattern, and multiplication section for multiplying the acquired frequency of appearance of the appearance pattern by the acquired number of occurrences of the action to calculate an index value.

In a fifth aspect of the present invention, each of the devices includes: receiving section for receiving, from the assistance device, the occurrence pattern of the event, and information related to the plural tasks and the action corresponding to the occurrence pattern; storage section for storing, in a storage unit, the received occurrence pattern of the event, and information related to the plural tasks and the action corresponding to the occurrence pattern; occurrence pattern specifying section for specifying the occurrence pattern based on information related to the event that has occurred; and action performing section for performing an action based on information related to the action corresponding to the specified occurrence pattern.

In a sixth aspect of the present invention, the receiving section receives information about the time to erase the occurrence pattern of the event and the information related to the plural tasks and the action corresponding to the occurrence pattern, and the device further includes erasing section for erasing, from the storage unit, the occurrence pattern of the event and the information related to the plural tasks and the action corresponding to the occurrence pattern based on the received information about the time to erase.

In a seventh aspect of the present invention, there is provided a method capable of being executed in a system with an assistance device connected with plural devices in such a manner to enable data communication with the plural devices, the assistance device executing the method comprising the steps of: storing, in association with an occurrence pattern of an event, information related to plural tasks for determining whether a predetermined condition is fulfilled, and an action to be performed by a corresponding device; calculating an index value for determining the level of probability of the occurrence pattern of the event; determining whether the calculated index value is larger than a predetermined value; and sending, to the device to perform the action, the occurrence pattern of the event the index value of which is determined to be larger than the predetermined value, and information related to the plural tasks and the action corresponding to the occurrence pattern.

In an eighth aspect of the present invention, there is provided an assistance device connected with plural devices in such a manner to enable data communication with the plural devices, the assistance device comprising: a storage unit for storing, in association with an occurrence pattern of an event, information related to plural tasks for determining whether a predetermined condition is fulfilled, and an action to be performed by a corresponding device; index value calculating section for calculating an index value for determining a level of probability of the occurrence pattern of the event; determination section for determining whether the calculated index value is larger than a predetermined value; and sending section for sending, to the device to perform the action, the occurrence pattern of the event the index value of which is determined by the determination section to be larger than the predetermined value, and information related to the plural tasks and the action corresponding to the occurrence pattern.

In a ninth aspect of the present invention, there is provided a computer program capable of being executed in an assistance device connected with plural devices in such a manner to enable data communication therewith and including a storage unit for storing, in association with an occurrence pattern of an event, information related to plural tasks for determining whether a predetermined condition is fulfilled, and an action to be performed by a corresponding device. The computer program causes the assistance device function as: index value calculating section for calculating an index value for determining the level of probability of the occurrence pattern of the event; determination section for determining whether the calculated index value is larger than a predetermined value; and sending section for sending, to the device to perform the action, the occurrence pattern of the event the index value of which is determined by the determination section to be larger than the predetermined value, and information related to the plural tasks and the action corresponding to the occurrence pattern.

According to the present invention, an occurrence pattern of an event that has externally occurred and the probability of which is determined to be high, and information related to plural tasks and an action corresponding to the occurrence pattern are sent beforehand to a device to perform the action, so that even if the event occurs during a time period in which the device to perform the action is not connected to the assistance device, the action to be performed by the device can be performed without delay. Therefore, for example, even if a failure causing event has occurred in a device, an appropriate action can be performed as soon as possible, and this makes it possible to minimize the influence of failure occurrence.

BRIEF DESCRIPTION OF THE DRAWINGS

FIG. 13 contains tables for explaining a method of calculating the frequency of occurrence of event sequences using sequential pattern matching from the results of performing the tasks stored in association with each symptom information.

DETAILED DESCRIPTION OF THE INVENTION

Figure 1:
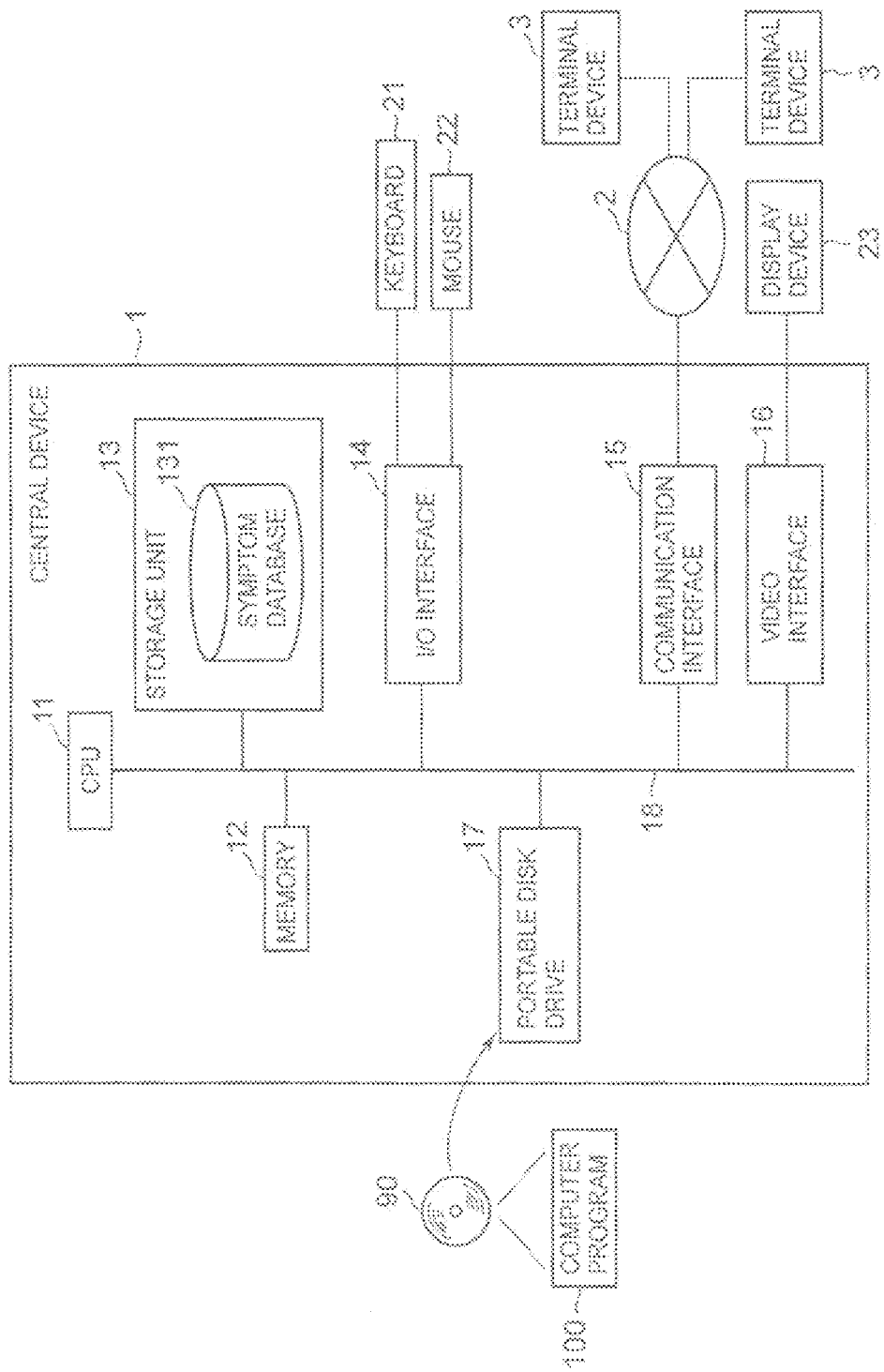
FIG. 1 is a block diagram showing a configuration example of a failure detection system according to Embodiment 1 of the present invention.

Systems for assistance in performing an action for a detected event according to preferred embodiments of the present invention will be specifically described below with reference to the accompanying drawings. The following embodiments do not limit the inventions described in the scope of claims, and not all the combinations of features described in the embodiments are requisites as resolving section of the present invention.

Further, the present invention can be carried out in a variety of different modes, and should not be limited to the descriptions given for the embodiments. It should be noted that the same reference numerals are employed throughout the embodiments to denote the same elements.

The following embodiments describe the systems, each configured to include a central device, which introduces a computer program into a computer system, and plural terminal devices connected to enable data communication. As will be apparent to those skilled in the art, part of the present invention can be implemented as a computer program capable of being executed on a computer such as an assistance device. Therefore, the present invention can take the form of a mode as hardware including a central device and terminal devices, a mode as software, or a mode as a combination of software and hardware. The computer program can be recorded on a recording medium readable by any computer, such as a hard disk, a DVD, a CD, an optical storage unit, or a magnetic storage unit.

The prior art failure event monitoring methods construct systems on the premise that the computers to be monitored are always connected to the network. In reality, however, since polling or the like is done at a given time interval to detect the occurrence of a failure, there is a certain time lag from the time of occurrence of a failure until the server detects the occurrence of the failure. This makes it difficult to detect the occurrence of the failure in real time.

Particularly, in a distributed network, a resource side as a monitoring target sends history information such as errors, logs, etc. to an administration server side at every given time interval, and the administration server side analyzes an event to specify an action to be performed by the resource side as the monitoring target. Therefore, the time for the resource side to perform the action depends on the connection interval between the resource side as the monitoring target and the administration server side, so that even if occurrence of a failure is detected early, it may take significant time before an action is performed on the resource side as the monitoring target, and this causes a problem that response may be delayed.

The present invention provides a system, method and product for improved responsiveness for assistance in performing an action for a detected event which provide help for a monitoring target resource whose connection is not an always-on connection. An appropriate action is performed as soon as possible in response to occurrence of a failure.

In the embodiments of the present invention, an occurrence pattern of an event that has externally occurred and determined to be high in probability to occur, and information related to a plurality of tasks and an action corresponding to the occurrence pattern are sent beforehand to a device to perform the action, so that even if the event occurs in a time period during which the device is not connected to an assistance device (central device), the action to be performed by the device can be performed without delay. Therefore, for example, even if a failure causing event has occurred in the device, the device can perform an appropriate action as soon as possible, so that the influence of occurrence of the failure can be minimized.

Further, an occurrence pattern and information related to a plurality of tasks and the action corresponding to the occurrence pattern (hereinafter called symptom information), all of which are stored in a storage unit of a device to perform the action, e.g., a terminal device, are erased at predetermined timing, and new symptom information is received from the assistance device (central device) and stored. This makes it possible to store symptom information with high probability to occur while reflecting the most recent status of occurrence of events, enabling the device to perform an appropriate action without sending the assistance device information related to an event that has occurred.

FIG. 1 is a block diagram showing a configuration example of a failure detection system according to Embodiment 1 of the present invention. The failure detection system according to an illustrative embodiment of the present invention is configured to include a central device 1 functioning as an assistance device, and plural terminal devices 3, 3, . . . connected to enable data communication with the central device 1 through a network 2.

The central device 1 includes at least a CPU (Central Processing Unit) 11, a memory 12, a storage unit 13, an I/O interface 14, a communication interface 15, a video interface 16, a portable disk drive 17, and an internal bus 18 connecting the above-mentioned hardware components.

The CPU 11 is connected to each of the above-mentioned hardware components of the central device 1 through the internal bus 18 to control the operation of each of the above-mentioned hardware components and execute various software functions according to a computer program 100 stored in the storage unit 13. The memory 12 is configured as a volatile memory, such as SRAM or SDRAM. Upon running the computer program 100, a load module is loaded into the memory 12, and temporary data and the like generated during execution of the computer program 100 are stored in the memory 12.

The storage unit 13 is configured as a built-in fixed type storage unit (hard disk), a ROM, or the like. The computer program 100 stored in the storage unit 13 is downloaded from a portable recording medium 90, such as a DVD or a CD-ROM, on which the program and information such as data are recorded, through the portable disk drive 17, and during the execution, loaded from the storage unit 13 into the memory 12. Of course, the computer program may be downloaded from an external computer connected to the network 2 through the communication interface 15.

The storage unit 13 includes a symptom database 131. In the symptom database 131, occurrence pattern data indicative of patterns in which events occur, plural tasks corresponding each of the occurrence patterns, detailed data of symptoms, action data indicative of actions, etc. are stored. Note that the plural tasks may construct a determination workflow as time-series tasks. In this case, it is determined whether each task fulfills a predetermined condition.

Figure 2:
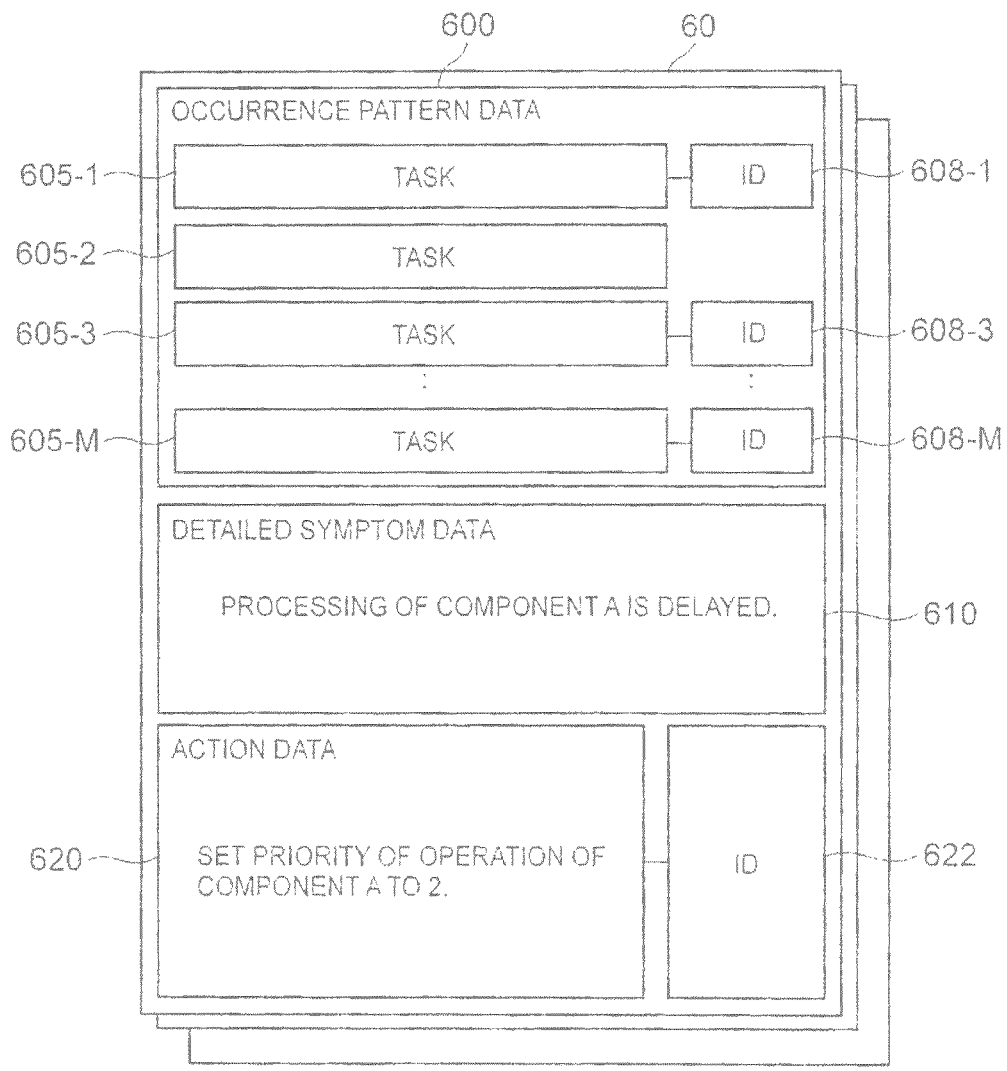
FIG. 2 is an illustration of the data structure of a symptom database of the failure detection system according to Embodiment 1 of the present invention.

FIG. 2 is an illustration of the data structure of the symptom database 131 of the failure detection system according to an embodiment of the present invention. The symptom database 131 stores symptom information 60 for each of occurrence patterns of events to be detected.

The combination of pieces of symptom information 60 is different depending on the terminal device 3. The central device 1 stores predetermined pieces of symptom information 60, 60, . . . upon delivery of a system product, or at the time of introducing autonomic management software.

The symptom information 60 consists of occurrence pattern data 600, detailed symptom data 610, and action data 620. The occurrence pattern data 600 indicates an occurrence pattern of an event to be detected for each terminal device 3. Specifically, plural tasks 605-1, 605-2, 605-3, . . . , 605-M are stored in association with identification information (ID) 608-1, 608-2, 608-3, . . . , 608-M of terminal devices 3 that process the tasks, respectively.

For example, task 605-1 is a task for determining a predetermined condition, and is stored in a terminal device 3 to perform processing in association with identification information 608-1. Of course, like task 605-2, only information related to the task may be stored without association with identification information of a terminal device 3.

When a condition determined by each task is fulfilled, the detailed symptom data 610 shows information about a symptom appearing in a terminal device 3 to perform processing. The detailed symptom data 610 may be output when it is determined that the condition is fulfilled, or set to be able to be referred to only when a system administrator performs maintenance.

The action data 620 shows processing to be performed when an event has occurred in a predetermined occurrence pattern. A content of specific set processing, such as "set priority of operation of component A to 2." Note that the stored information is not limited to the specific set processing, and processing for drawing users' attention, such as "display information related to an event that has occurred," may be shown.

In one illustrative embodiment, although the content of the set processing is represented in natural language for the sake of easy understanding, it may be a command, a parameter, etc. to make the setting. Further, identification information 622 of a terminal device 3 to perform an action may be stored in association with the action data 620. This allows the central device 1 to understand which terminal device 3 should perform the action, and hence to send an instruction to perform the action properly.

Figure 3:
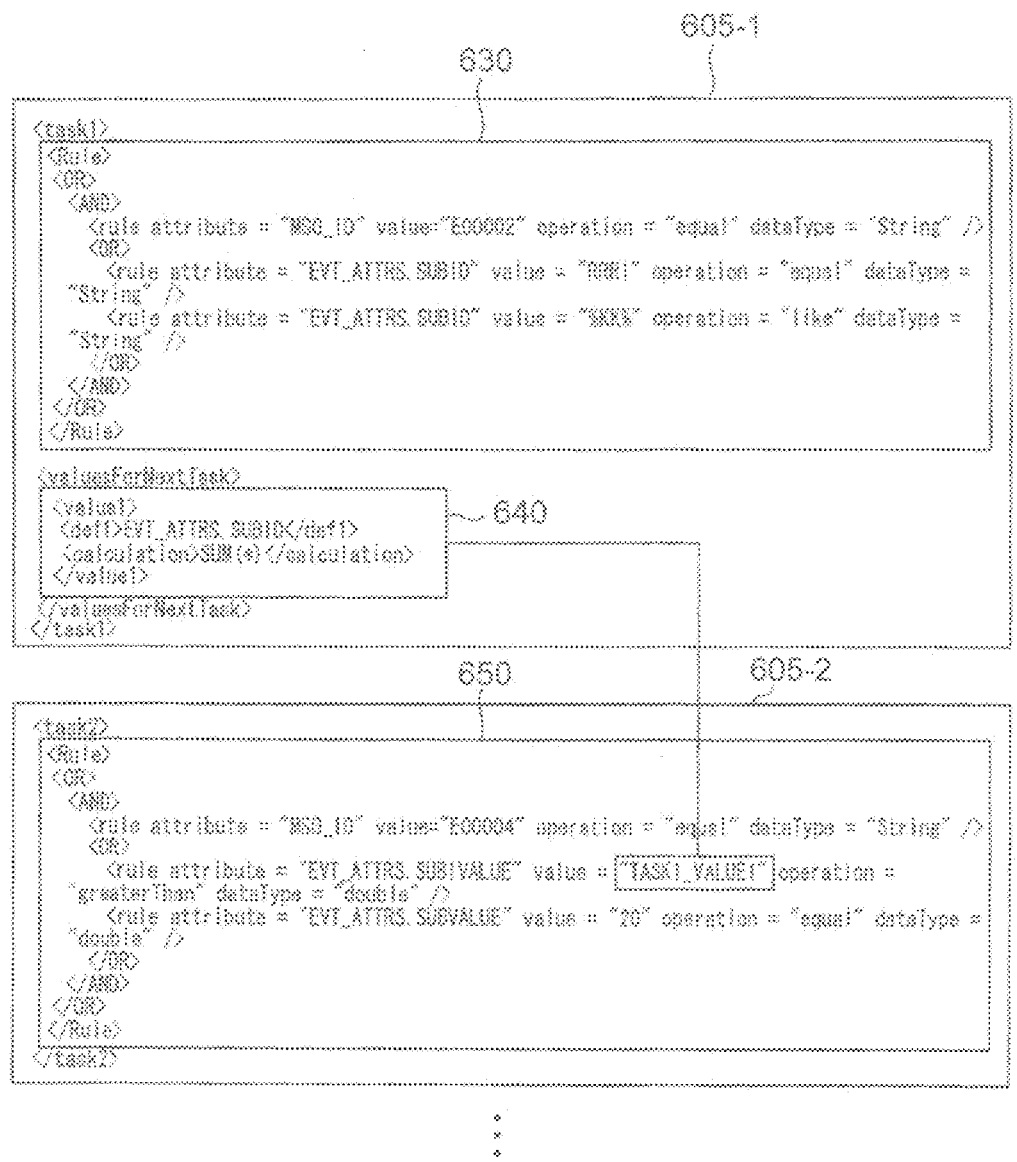
FIG. 3 is an illustration of a specific task definition in the symptom database according to Embodiment 1 of the present invention.

FIG. 3 is an illustration of a specific task definition in the symptom database 131 according to Embodiment 1 of the present invention. For example, task 605-1 consists of a subexpression 630 and an output definition 640. The subexpression 630 is a statement of substantial determination processing. For example, the subexpression 630 determines, for each of plural events that have occurred, whether its identification information (ID), attribute, etc. are predetermined values or not, and logical values indicative of the determination results are subjected to logical AND operation or logical OR operation to calculate an evaluated value. The output definition 640 indicates a method of calculating a numeric value to be output to another task 605-2 in addition to the evaluated value.

Task 605-2 consists of a subexpression 650. Like the subexpression 630, the subexpression 650 determines for each of plural events that have occurred whether its identification information (ID), attribute, etc. are predetermined values or not, and logical values indicative of the determination results are subjected to logical AND operation or logical OR operation to calculate an evaluated value. The subexpression 650 includes a statement to refer to the output value calculated in the output definition 640 in the process of calculation.

The condition determined by each task is not limited to the condition based on the identification information (ID) or attribute of each event. For example, the number of occurrences of an event, the order of occurrence of plural events, a condition whether a predetermined combination of events have occurred within a given time period, a condition whether any event occurs, or a combination of these conditions may be determined.

Returning to FIG. 1, the communication interface 15 is connected to the internal bus 18 so that it can exchange data with an external computer or the like by being connected to the external network 2 such as the Internet, LAN, or WAN. The communication interface 15 is also connected to monitoring target terminal devices 3, 3, . . . through the network 2, making it possible to acquire information related to a failure causing event and the like.

The I/O interface 14 is connected to data input media, such as a keyboard 21 and a mouse 22, to receive data input. The video interface 16 is connected to a display device 23, such as a CRT monitor or an LCD, to display certain images.

Figure 4:
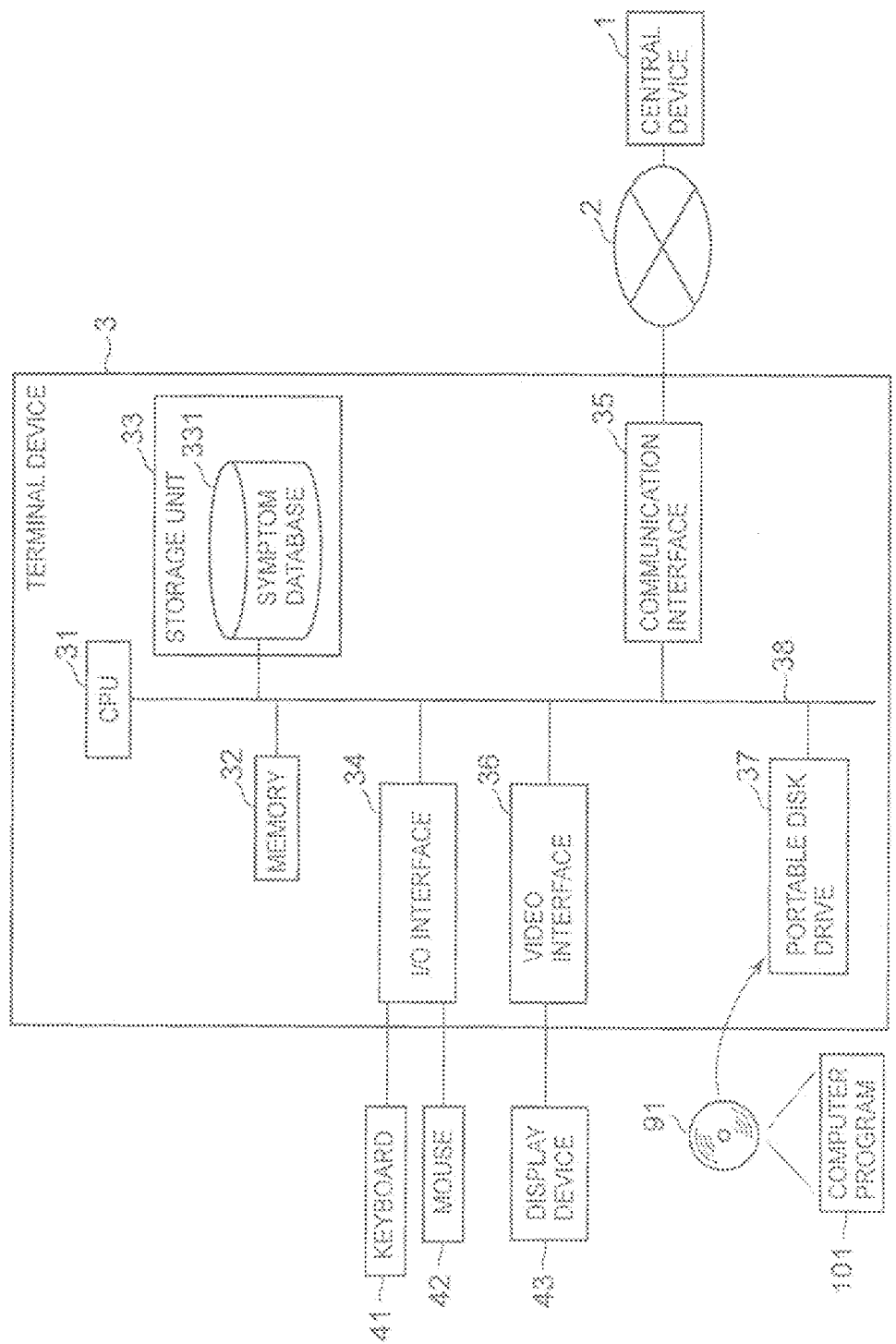
FIG. 4 is a block diagram showing a configuration of a terminal device according to Embodiment 1 of the present invention.

FIG. 4 is a block diagram showing a configuration of a terminal device 3 according to an embodiment of the present invention. The terminal device 3 is configured to include at least a CPU (Central Processing Unit) 31, a memory 32, a storage unit 33, an I/O interface 34, a communication interface 35, a video interface 36, a portable disk drive 37, and an internal bus 38 connecting the above-mentioned hardware components.

The CPU 31 is connected to each of the above-mentioned hardware components of the terminal device 3 through the internal bus 38 to control the operation of each of the above-mentioned hardware components and execute various software functions according to a computer program 101 stored in the storage unit 33. The memory 32 is configured as a volatile memory, such as SRAM or SDRAM.

Upon running the computer program 101, a load module is loaded into the memory 32, and temporary data and the like generated during execution of the computer program 101 are stored in the memory 32.

The storage unit 33 is configured as a built-in fixed type storage device (hard disk), a ROM, or the like. The computer program 101 stored in the storage unit 33 is downloaded from a portable recording medium 91, such as a DVD or a CD-ROM, on which the program and information such as data are recorded, through the portable disk drive 37, and during the execution, loaded from the storage unit 33 into the memory 32. Of course, the computer program may be downloaded from an external computer connected to the network 2 through the communication interface 35.

The storage unit 33 includes a symptom information storing section 331. In the symptom information storing section 331, occurrence pattern data indicative of patterns in which events occur, time-series tasks corresponding to each of the occurrence patterns, detailed data of symptoms, action data indicative of actions, etc. are stored. The time-series tasks construct a determination workflow to determine whether a predetermined condition is fulfilled.

The communication interface 35 is connected to the internal bus 38 so that it can exchange data with an external computer or the like by being connected to the external network 2 such as the Internet, LAN, or WAN. The communication interface 35 is also connected to the central device 1 through the network 2, making it possible to send information related to a failure causing event and the like.

The I/O interface 34 is connected to data input media, such as a keyboard 41 and a mouse 42, to receive data input. The video interface 36 is connected to a display device 43, such as a CRT monitor or an LCD, to display certain images.

Figure 5:
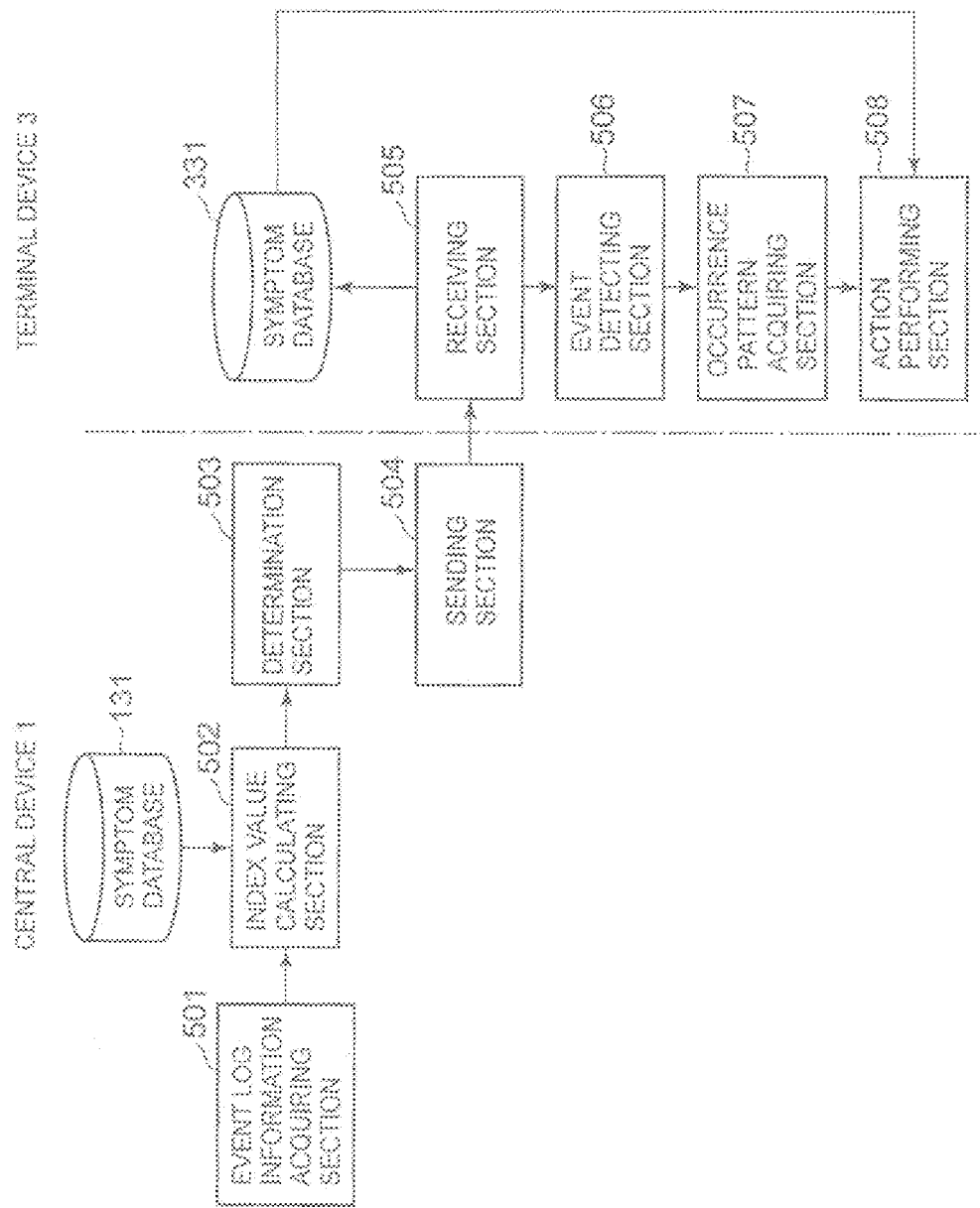
FIG. 5 is a functional block diagram of a central device and the terminal device according to Embodiment 1 of the present invention.

FIG. 5 is a functional block diagram of the central device 1 and the terminal device 3 according to Embodiment 1 of the present invention. An event log information acquiring section 501 of the central device 1 acquires event log information as history information of events that have occurred in the terminal device 3 connected to the central device 1. The timing of acquiring the event log information is not particularly limited, and it may be the time when the terminal device 3 is connected to the central device 1, each time a new event occurs, or every given time interval.

Based on the acquired event log information, an index value calculating section 502 calculates an index value for determining the level of probability of an occurrence pattern of an event. The index value to be calculated is not particularly limited. For example, the number of tasks whose determination results are "false" among plural tasks contained in the determination workflow, the frequency of occurrence of an event sequence determined by sequential pattern matching, or the like, is calculated.

A determination section 503 determines whether the index value calculated by the index value calculating section 502 is larger than a predetermined value. For example, if the calculated index value is larger than the predetermined value, it can be determined that the probability of the occurrence pattern of the event is high, while if it is equal to or less than the predetermined value, it is determined that the probability of the occurrence pattern of the event is low.

A sending section 504 sends the terminal device 3 the occurrence pattern of the event whose probability to occur is determined by the determination section 503 to be high, and information related to plural tasks and an action corresponding to the occurrence pattern, i.e., symptom information whose probability to occur is determined to be high among the pieces of symptom information stored in the symptom database 131.

A receiving section 505 of the terminal device 3 receives, from the central device 1, the occurrence pattern of the event whose probability to occur is determined to be high, and the information related to the plural tasks and the action corresponding to the occurrence pattern, i.e., the symptom information, and stores it in the symptom information storing section 331.

An event detecting section 506 detects an event that has occurred in the terminal device 3, and based on information related to the detected event that has occurred, an occurrence pattern specifying section 507 specifies an occurrence pattern. Then, an action performing section 508 refers to the symptom information storing section 331 and performs an action corresponding to the specified occurrence pattern based on information related to the action.

Since symptom information corresponding to an occurrence pattern of an event whose probability to occur has been determined to be high is stored beforehand in the symptom information storing section 331 of the terminal device 3, even if the terminal device 3 is not connected to the central device 1, it is likely that symptom information that matches the occurrence pattern is stored in the symptom information storing section 331. In most cases, an appropriate action can be performed based on the symptom information stored.

In the case of a conventional terminal device 3, if the terminal device 3 is not connected to the central device 1, the terminal device 3 receives instruction information to perform an action at timing of sending event log information on a periodic basis, and performs the action. Therefore, when an event having a predetermined occurrence pattern has occurred, it takes significant time before the action is performed.

In contrast, according to an embodiment of the present invention, an appropriate action can be performed based on symptom information stored in the symptom information storing section 331, and this makes it possible to reduce the possibility of a time lag from the time of occurrence of an event having a predetermined occurrence pattern until the action is performed, and hence to perform the appropriate action as soon as possible.

It is preferable that the sending section 504 should send the terminal device 3 information about the time to erase the symptom information as the occurrence pattern of the event and the information related to the plural tasks and the action corresponding to the occurrence pattern together with the symptom information upon sending the symptom information. This makes it possible to prevent overload on the computer resources of the terminal device 3 and to constantly update, to the latest information, symptom information corresponding to an occurrence pattern of an event whose probability to occur is determined to be high in order to give the terminal device 3 more chances to perform actions by itself without data communication with the central device 1.

Figure 6:
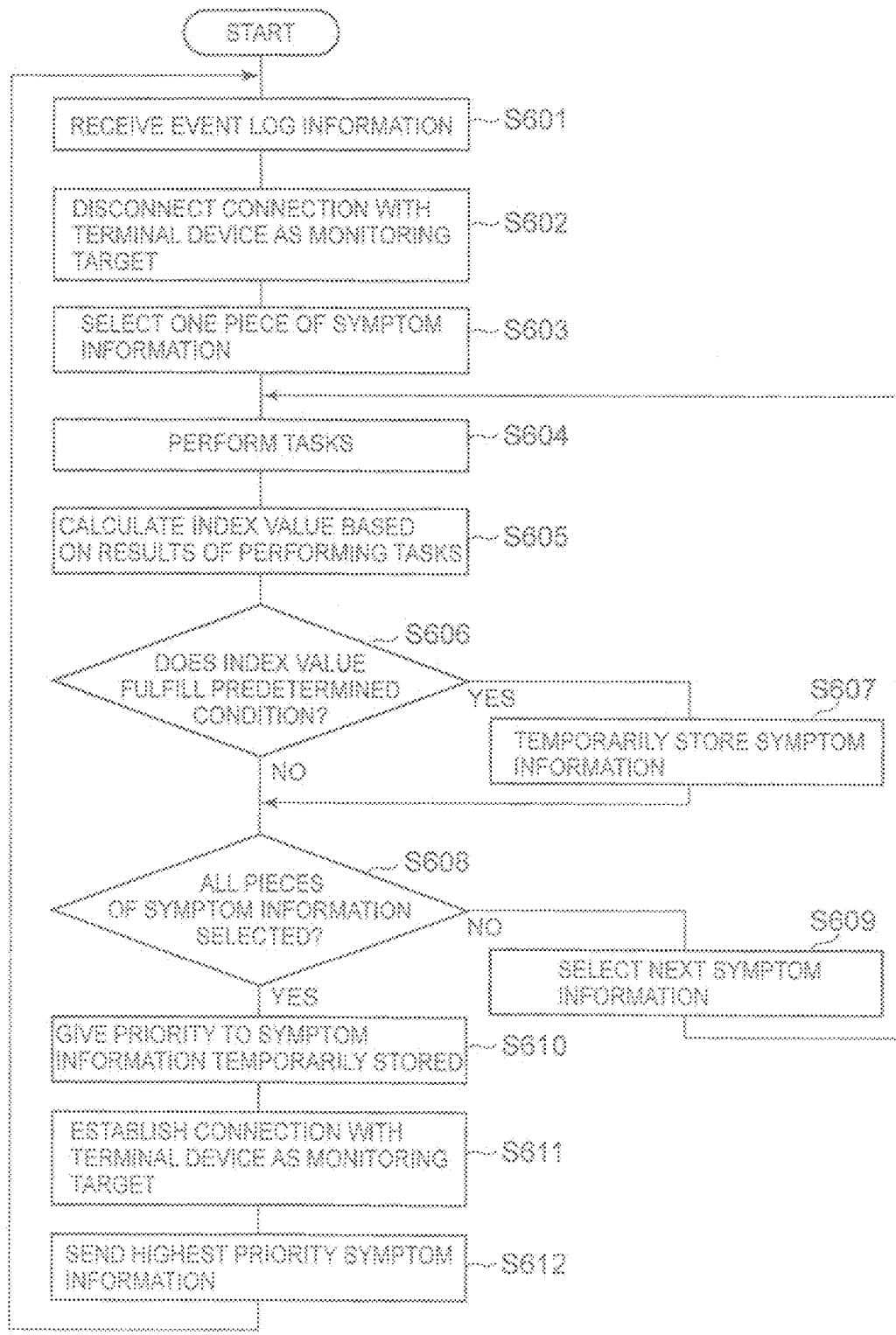
FIG. 6 is a flowchart showing procedure of processing performed by a CPU of the central device of the failure detection system according to Embodiment 1 of the present invention.

FIG. 6 is a flowchart showing a procedure of processing performed by the CPU 11 of the central device 1 of the failure detection system according to Embodiment 1 of the present invention. The CPU 11 of the central device 1 receives, from each terminal device 3 connected to the central device 1, event log information as history information of events that have occurred (step S601). The timing of receiving the event log information is not particularly limited, and it may be the time when the terminal device 3 is connected to the central device 1, each time a new event occurs, or every given time interval.

The CPU 11 disconnects the connection with a terminal device 3 as a monitoring target (step S602), and selects one piece of symptom information from among the plural pieces of symptom information stored in the symptom database 131 of the storage unit 13 (step S603). Then, the CPU 11 performs tasks stored in association with the selected symptom information (step S604), and based on the results of performing the tasks, the CPU 11 calculates an index value for determining the level of probability of a corresponding occurrence pattern of an event (step S605). The index value to be calculated is not particularly limited. For example, the number of tasks whose determination results are "false" among plural tasks performed in chronological order like in a determination workflow, the frequency of occurrence of an event sequence determined by sequential pattern matching, or the like, is calculated.

The CPU 11 determines whether the calculated index value fulfills a predetermined condition (step S606). For example, it is determined whether the calculated index value is larger than a predetermined value. If determining that the index value fulfills the predetermined condition (YES in step S606), the CPU 11 temporarily stores the selected symptom information in the symptom information storing section 331 (step S607).

If determining that the index value does not fulfill the predetermined condition (NO in step S606), the CPU 11 then determines whether all the pieces of symptom information stored in the symptom database 131 have been selected (step S608). If determining that there is symptom information that is not selected yet (NO in step S608), the CPU 11 selects the next symptom information (step S609), and returns processing to step S604 to repeat the above-mentioned operations.

If determining that all the pieces of symptom information have been selected (YES in step S608), the CPU 11 gives priority to the pieces of symptom information temporarily stored in the symptom information storing section 331 (step S610). The method of giving priority is decided based on the index value calculated.

The CPU 11 establishes a connection with the terminal device 3 as the monitoring target (step S611), sends the highest priority symptom information to the terminal device 3 (step S612), and returns processing to step S601 to repeat the above-mentioned operations. Of course, symptom information to be sent is not limited to the highest priority symptom information, and all the pieces of symptom information temporarily stored may be sent, or two or more pieces of symptom information with higher priorities may be sent.

Figure 7:
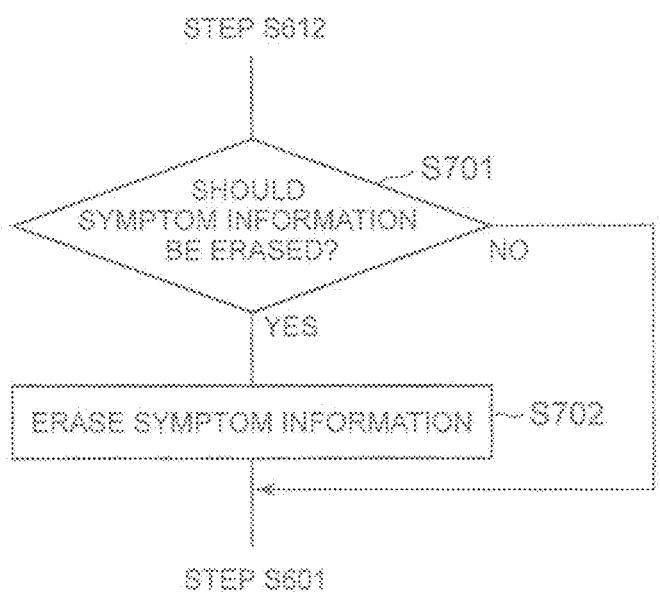
FIG. 7 is a flowchart showing procedure of symptom information erasing processing performed by the CPU of the central device of the failure detection system according to Embodiment 1 of the present invention.

FIG. 7 is a flowchart showing a procedure of symptom information erasing processing performed by the CPU 11 of the central device 1 of the failure detection system according to Embodiment 1 of the present invention. After sending the highest priority symptom information to the terminal device 3 (step S612), the CPU 11 of the central device 1 determines, based on information about the time to erase the received symptom information, whether the symptom information temporarily stored in the symptom information storing section 331 should be erased (step S701). If determining that the symptom information should be erased (YES in step S701), the CPU 11 erases the symptom information temporarily stored (step S702). If determining that the symptom information should not be erased (NO in step S701), the CPU 11 returns processing to step S601 to repeat the above-mentioned operations.

Thus, according to the invention, an appropriate action can be performed based on the symptom information stored in the symptom information storing section 331, and this makes it possible to reduce the possibility of a time lag from the time of occurrence of an event having a predetermined occurrence pattern until the action is performed, and hence to perform an appropriate action as soon as possible. Therefore, for example, even if a failure causing event has occurred, an appropriate action can be performed as soon as possible, so that the influence of occurrence of the failure can be minimized.

Since the hardware configuration of a failure detection system according to another illustrative embodiment of the present invention is to similar to the embodiment discussed above, the detailed description thereof will be omitted by attaching the same reference numerals to denote the same elements. The embodiment differs in that the index value to be calculated is the number of tasks whose determination results are "false" among plural tasks contained in an event sequence.

Figure 8:
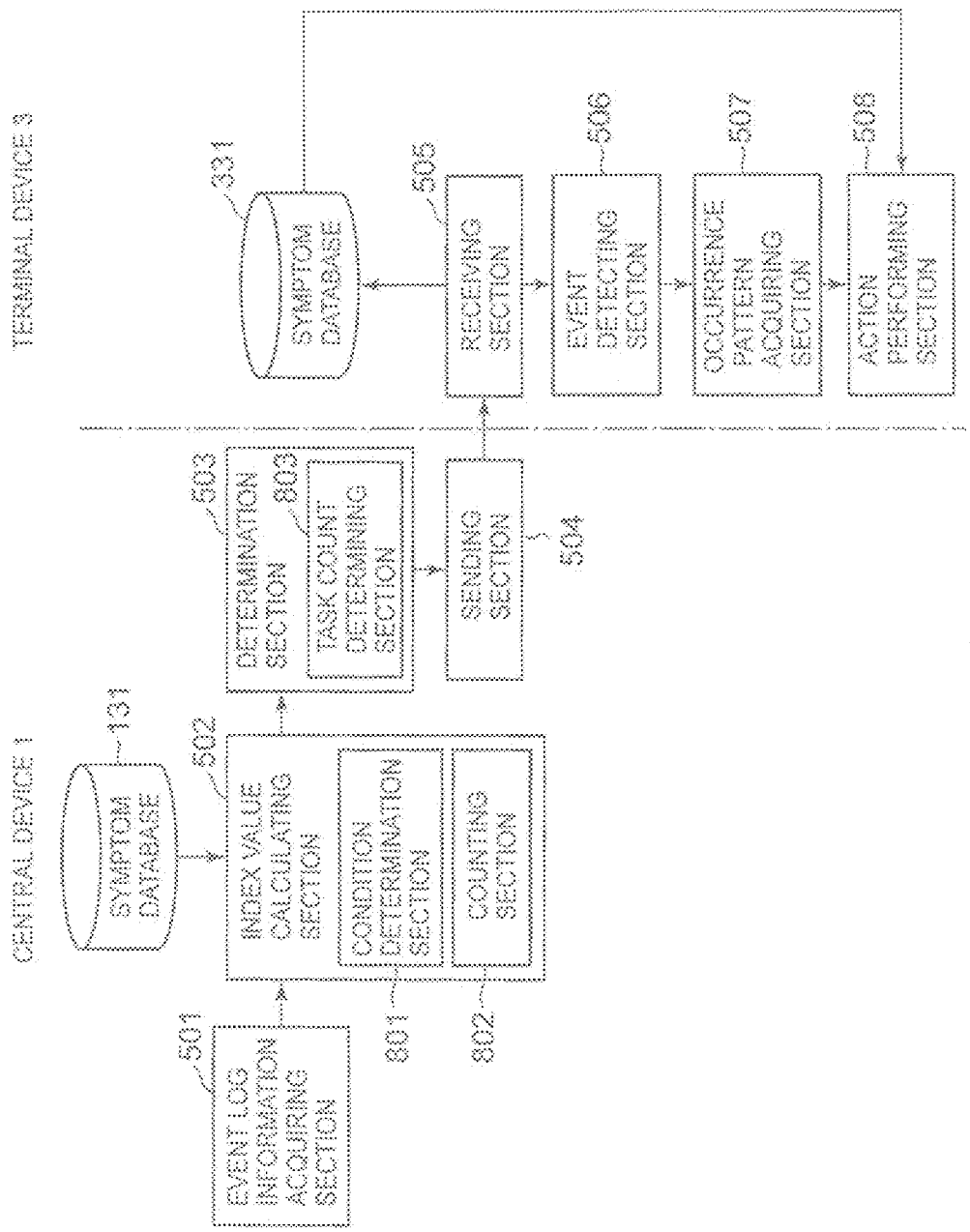
FIG. 8 is a functional block diagram of the central device and the terminal device according to Embodiment 2 of the present invention.

FIG. 8 is a functional block diagram of the central device 1 and the terminal device 3 according to another illustrative of the present invention. The event log information acquiring section 501 of the central device 1 acquires event log information as history information of events that have occurred in each terminal device 3 connected to the central device 1. The timing of acquiring the event log information is not particularly limited, and it may be the time when the terminal device 3 is connected to the central device 1, each time a new event occurs, or every given time interval.

The index value calculating section 502 includes a condition determination section 801 for sequentially performing tasks contained in an event sequence included in the event log information to determine whether a predetermined condition is fulfilled, and a counting section 802 for counting the number of tasks determined not to fulfill a predetermined condition. The condition determination section 801 determines, for each of plural events that have occurred, whether its attribute and the like are predetermined values, and performs AND operation or OR operation on logical values indicative of the determination results to calculate an evaluated value. Therefore, each logical value has a value of "True (T)" or "False (F)." The counting section 802 counts the number of tasks determining that the logical values are "False (F)" and sets it as an index value.

The determination section 503 determines whether the index value calculated by the index value calculating section 502, i.e., the count value counted by the counting section 802 is larger than a predetermined value. In an illustrative embodiment, if the count value is smaller than the predetermined value, it is determined that the probability of the occurrence pattern of the event is high, while if it is equal to or more than the predetermined value, it is determined that the probability of the occurrence pattern of the event is low.

The sending section 504 sends the terminal device 3 the occurrence pattern of the event whose probability to occur is determined by the determination section 503 to be high, and information related to plural tasks and an action corresponding to the occurrence pattern, i.e., symptom information whose probability to occur is determined to be high among the pieces of symptom information stored in the symptom database 131.

The receiving section 505 of the terminal device 3 receives, from the central device 1, the occurrence pattern of the event whose probability to occur is determined to be high, and the information related to the plural tasks and the action corresponding to the occurrence pattern, i.e., the symptom information, and stores it in the symptom information storing section 331.

The event detecting section 506 detects an event that has occurred in the terminal device 3, and based on information related to the detected event that has occurred, the occurrence pattern specifying section 507 specifies an occurrence pattern. Then, the action performing section 508 refers to the symptom information storing section 331 and performs an action corresponding to the specified occurrence pattern based on information related to the action.

Since symptom information corresponding to an occurrence pattern of an event whose probability to occur has been determined to be high is stored beforehand in the symptom information storing section 331 of the terminal device 3, even if the terminal device 3 is not connected to the central device 1, it is likely that symptom information that matches the occurrence pattern is stored in the symptom information storing section 331. In most cases, an appropriate action can be performed based on the symptom information stored.

In some embodiments of the invention, it is preferable that the sending section 504 should send the terminal device 3 information about the time to erase the symptom information as the occurrence pattern of the event and the information related to the plural tasks and the action corresponding to the occurrence pattern together with the symptom information upon sending the symptom information. This makes it possible to prevent overload on the computer resources of the terminal device 3 and to constantly update, to the latest information, symptom information corresponding to an occurrence pattern of an event whose probability to occur is determined to be high in order to give the terminal device 3 more chances to perform actions by itself without data communication with the central device 1.

Figure 9:
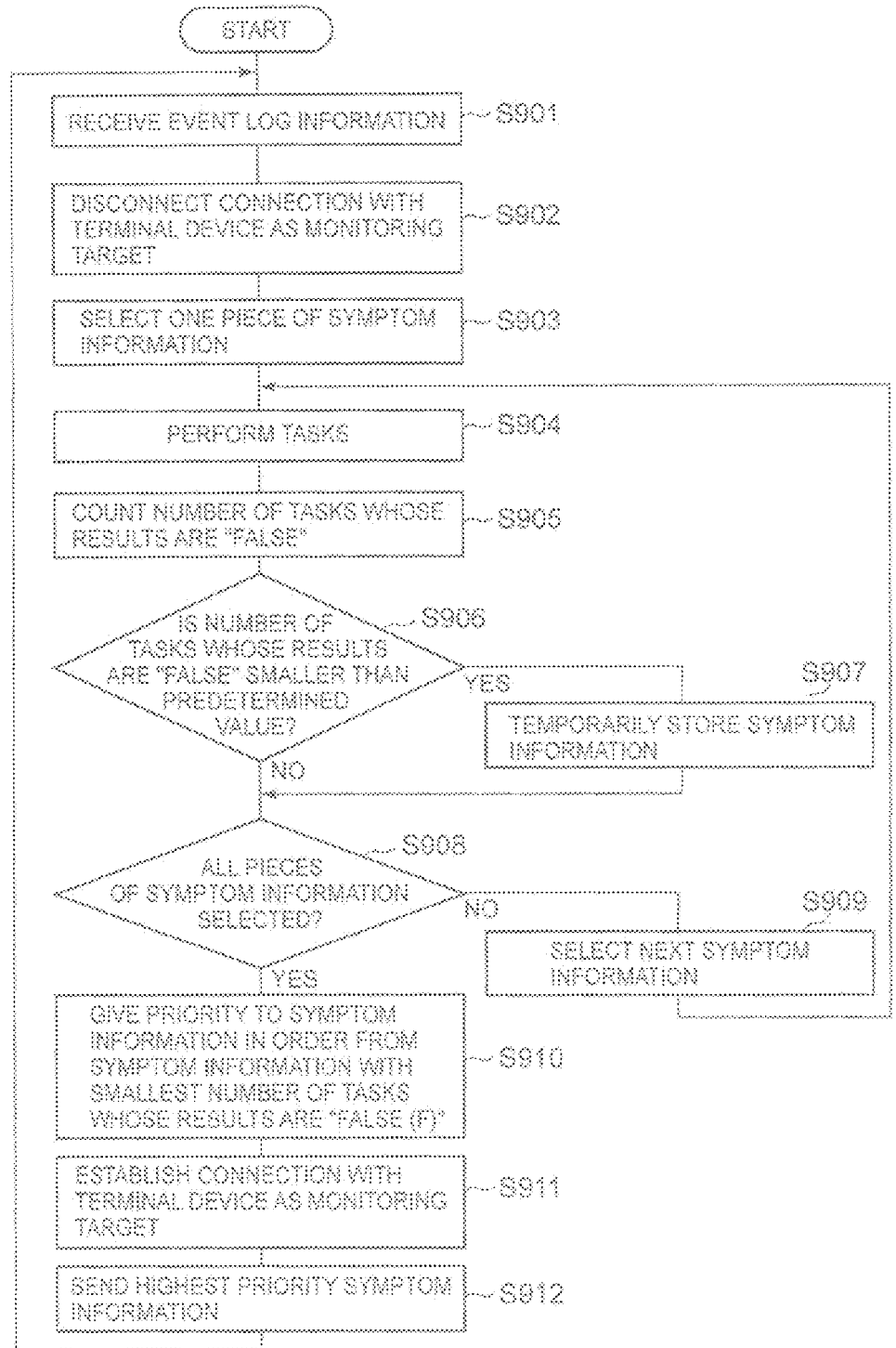
FIG. 9 is a flowchart showing a procedure of processing performed by the CPU of the central device of the failure detection system according to Embodiment 2 of the present invention.

FIG. 9 is a flowchart showing a procedure of processing performed by the CPU 11 of the central device 1 of the failure detection system according to Embodiment 2 of the present invention. The CPU 11 of the central device 1 receives, from each terminal device 3 connected to the central device 1, event log information as history information of events that have occurred (step S901). The timing of receiving the event log information is not particularly limited, and it may be the time when the terminal device 3 is connected to the central device 1, each time a new event occurs, or every given time interval.

The CPU 11 disconnects the connection with a terminal device 3 as a monitoring target (step S902), and selects one piece of symptom information from among the plural pieces of symptom information stored in the symptom database 131 of the storage unit 13 (step S903). Then, the CPU 11 performs tasks stored in association with the selected symptom information (step S904), and counts the number of tasks the results of which are "False (F)" as an index value for determining the level of probability of each occurrence pattern of an event (step S905).

Figure 10:
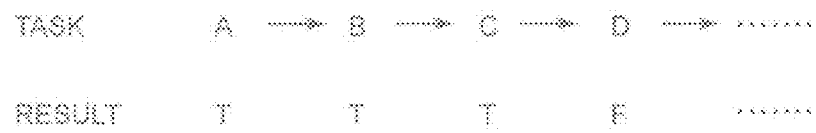
FIG. 10 is an illustration for explaining a method of calculating an index value from the results of performing tasks included in each symptom information.

FIG. 10 is an illustration for explaining a method of calculating the index value from the results of performing the tasks stored in association with each symptom information. As shown in FIG. 10, plural tasks A, B, C, D, . . . are associated with and stored in the selected one piece of symptom information.

The tasks are performed sequentially, and the results of the tasks are determined as "True (T)" or "False (F)." In FIG. 10, results of performing the tasks A, B, C, D, . . . in this order are determined as T, T, T, F, . . . . Then, the number of tasks the results of which are "False (F)" is counted, and the count value is set as an index value.

Returning to FIG. 9, the CPU 11 of the central device 1 determines whether the number of tasks the results of which are "False (F)" is smaller than a predetermined value (step S906). If it is determined that the number of tasks the results of which are "False (F)" is smaller than the predetermined value (YES in step S906), the CPU 11 temporarily stores the selected symptom information in the symptom information storing section 331 (step S907).

If it is determined that the number of tasks the results of which are "False (F)" is equal to or more than the predetermined value (NO in step S906), the CPU 11 then determines whether all the pieces of symptom information stored in the symptom database 131 have been selected (step S908). If determining that there is symptom information that is not selected yet (NO in step S908), the CPU 11 selects the next symptom information (step S909), and returns processing to step S904 to repeat the above-mentioned operations.

If it is determined that all the pieces of symptom information have been selected (YES in step S908), the CPU 11 gives priority to the pieces of symptom information temporarily stored in the symptom information storing section 331 in order from symptom information with the smallest number of tasks the results of which are "False (F)" (step S910).

The CPU 11 establishes a connection with the terminal device 3 as the monitoring target (step S911), sends the highest priority symptom information to the terminal device 3 (step S912), and returns processing to step S901 to repeat the above-mentioned operations. Of course, symptom information to be sent is not limited to the highest priority symptom information, and all the pieces of symptom information temporarily stored may be sent, or two or more pieces of symptom information with higher priorities may be sent.

Thus, according to an illustrative embodiment, symptom information with a fewer tasks the results of which are "False (F)" can be determined as symptom information corresponding to an occurrence pattern of an event whose probability to occur is higher. Therefore, the symptom information with the fewer tasks the results of which are "False (F)" is stored in the symptom information storing section 331 of the terminal device 3. This makes it possible to reduce the possibility of a time lag from the time of occurrence of an event having a predetermined occurrence pattern until the action is performed, and hence to perform an appropriate action as soon as possible. Therefore, for example, even if a failure causing event has occurred, an appropriate action can be performed as soon as possible, so that the influence of occurrence of the failure can be minimized.

Note that symptom information to be sent to the terminal device 3 is not limited to the symptom information with the fewer tasks the results of which are "False (F)." For example, only the tasks the results of which are "False (F)" may be sent to the terminal device 3. In this case, network loads for exchanging symptom information can also be reduced.

Since the hardware configuration of a failure detection system according to yet another illustrative embodiment of the present invention is similar to the embodiments described above, the detailed description thereof will be omitted by attaching the same reference numerals to denote the same elements. Another illustrative embodiment differs in that the index value to be calculated is the frequency of occurrence of an event sequence that occurs within a given time period starting at the time of occurrence of an action.

Figure 11:
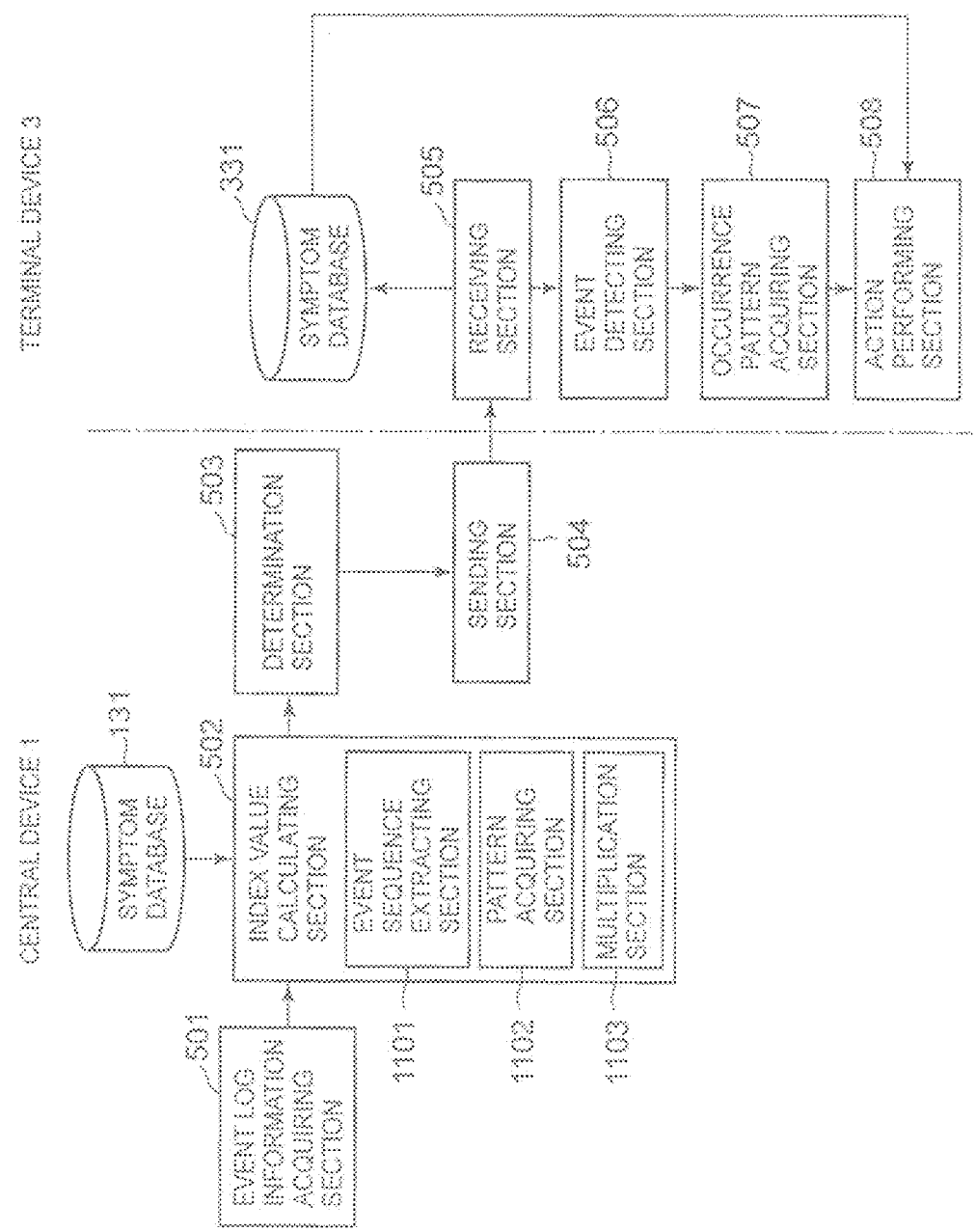
FIG. 11 is a functional block diagram of the central device and the terminal device according to Embodiment 3 of the present invention.

FIG. 11 is a functional block diagram of the central device 1 and the terminal device 3 according to an embodiment of the present invention. The event log information acquiring section 501 of the central device 1 acquires event log information as history information of events that have occurred in each terminal device 3 connected to the central device 1. The timing of acquiring the event log information is not particularly limited, and it may be the time when the terminal device 3 is connected to the central device 1, each time a new event occurs, or every given time interval.

The index value calculating section 502 performs sequential pattern matching to calculate the frequency of occurrence of event sequences included in the event log information. In other words, the index value calculating section 502 includes an event sequence extracting section 1101 for extracting plural event sequences that had occurred within a given time period before a predetermined action occurred, a pattern acquiring section 1102 for acquiring the frequency of appearance of each appearance pattern of events and the number of occurrences of each action contained in the appearance pattern, and a multiplication section 1103 for multiplying the acquired frequency of appearance of the appearance pattern by the acquired number of occurrences of the action contained in the appearance pattern to calculate an index value.

The determination section 503 determines whether the index value calculated by the index value calculating section 502, i.e., the multiplication result value calculated by the multiplication section 1103 is equal to or more than a predetermined value. In the illustrative embodiment, if the multiplication result value is equal to or more than the predetermined value, it is determined that the probability of the occurrence pattern of the event is high, while if it is smaller than the predetermined value, it is determined that the probability of the occurrence pattern of the event is low.

The sending section 504 sends the terminal device 3 the occurrence pattern of the event whose probability to occur is determined by the determination section 503 to be high, and information related to plural tasks and an action corresponding to the occurrence pattern, i.e., symptom information whose probability to occur is determined to be high among the pieces of symptom information stored in the symptom database 131.

The receiving section 505 of the terminal device 3 receives, from the central device 1, the occurrence pattern of the event whose probability to occur is determined to be high, and the information related to the plural tasks and the action corresponding to the occurrence pattern, i.e., the symptom information, and stores it in the symptom information storing section 331.

The event detecting section 506 detects an event that has occurred in the terminal device 3, and based on information related to the detected event that has occurred, the occurrence pattern specifying section 507 specifies an occurrence pattern. Then, the action performing section 508 refers to the symptom information storing section 331 and performs an action corresponding to the specified occurrence pattern based on information related to the action.

Since symptom information corresponding to an occurrence pattern of an event whose probability to occur has been determined to be high is stored beforehand in the symptom information storing section 331 of the terminal device 3, even if the terminal device 3 is not connected to the central device 1, it is likely that symptom information that matches the occurrence pattern is stored in the symptom information storing section 331. In most cases, an appropriate action can be performed based on the symptom information stored.

In some illustrative embodiments, it is preferable that the sending section 504 should send the terminal device 3 information about the time to erase the symptom information as the occurrence pattern of the event and the information related to the plural tasks and the action corresponding to the occurrence pattern together with the symptom information upon sending the symptom information. This makes it possible to prevent overload on the computer resources of the terminal device 3 and to constantly update, to the latest information, symptom information corresponding to an occurrence pattern of an event whose probability to occur is determined to be high in order to give the terminal device 3 more chances to perform actions by itself without data communication with the central device 1.

Figure 12:
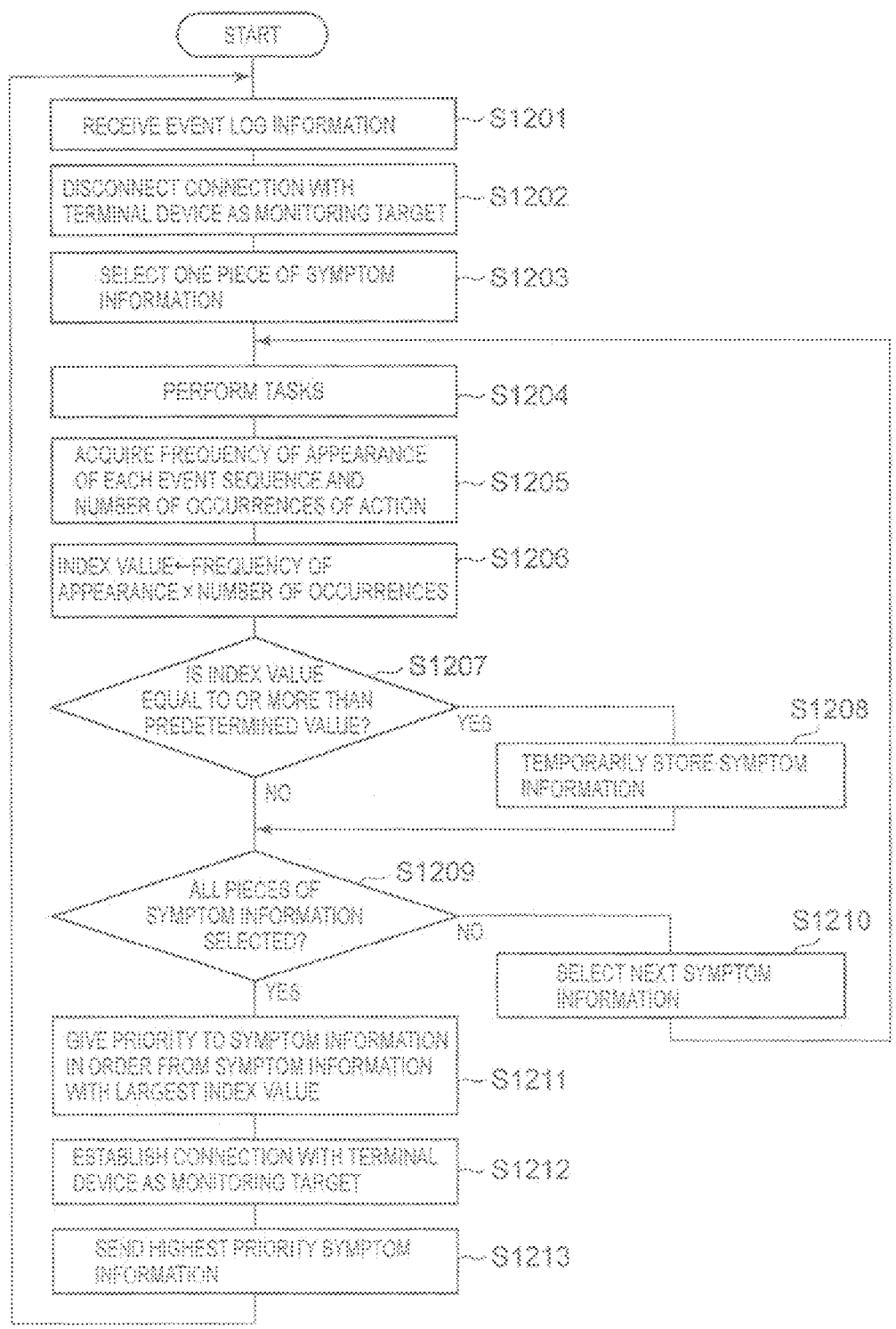
FIG. 12 is a flowchart showing a procedure of processing performed by the CPU of the central device of the failure detection system according to Embodiment 3 of the present invention.

FIG. 12 is a flowchart showing a procedure of processing performed by the CPU 11 of the central device 1 of the failure detection system according to Embodiment 3 of the present invention. The CPU 11 of the central device 1 receives, from each terminal device 3 connected to the central device 1, event log information as history information of events that have occurred (step S1201). The timing of receiving the event log information is not particularly limited, and it may be the time when the terminal device 3 is connected to the central device 1, each time a new event occurs, or every given time interval.

The CPU 11 disconnects the connection with a terminal device 3 as a monitoring target (step S1202), and selects one piece of symptom information from among the plural pieces of symptom information stored in the symptom database 131 of the storage unit 13 (step S1203). Then, the CPU 11 performs tasks stored in association with the selected symptom information (step S1204), and acquires the frequency of appearance of each appearance pattern of event sequences and the number of occurrences of each action (step S1205).

FIG. 13 contains tables for explaining a method of calculating the frequency of occurrence of event sequences using sequential pattern matching from the results of performing the tasks stored in association with each symptom information. FIG. 13(a) is a table showing actions that occurred and event sequences that had occurred within a given time period before the action occurred. An event sequence indicative of a certain appearance pattern is shown for each action that occurred.

FIG. 13(b) is a table showing the frequency of appearance contained in each action that occurred in association with each appearance pattern of event sequences determined by sequential pattern matching, and the number of occurrences of each action. The appearance pattern shown in FIG. 13(b) is determined in such a manner to calculate the frequency of appearance contained in each event sequence of FIG. 13(a) by a known method and calculate the number of occurrences of each action contained in the appearance pattern of the event sequence.

Returning to FIG. 12, the CPU 11 of the central device 1 multiplies the frequency of appearance by the number of occurrences to calculate an index value (step S1206) and determines whether the index value is equal to or more than a predetermined value (step S1207). If determining that the index value is equal to or more than the predetermined value (YES in step S1207), the CPU 11 temporarily stores the selected symptom information in the symptom information storing section 331 (step S1208).

If it is determined that the index value is smaller than the predetermined value (No in step S1207), the CPU 11 then determines whether all the pieces of symptom information stored in the symptom database 131 have been selected (step S1209). If determining that there is symptom information that is not selected yet (NO in step S1209), the CPU 11 selects the next symptom information (step S1210), and returns processing to step S1204 to repeat the above-mentioned operations.

If it is determined that all the pieces of symptom information have been selected (YES in step S1209), the CPU 11 gives priority to the pieces of symptom information temporarily stored in the symptom information storing section 331 in order from symptom information with the largest index value (step S1211).

The CPU 11 establishes a connection with the terminal device 3 as the monitoring target (step S1212), sends the highest priority symptom information to the terminal device 3 (step S1213), and returns processing to step S1201 to repeat the above-mentioned operations. Of course, symptom information to be sent is not limited to the highest priority symptom information, and all the pieces of symptom information temporarily stored may be sent, or two or more pieces of symptom information with higher priorities may be sent.

Thus, according to an illustrative embodiment of the invention, symptom information including an event sequence contained in an action with a higher frequency of appearance and a larger number of occurrences can be determined as symptom information corresponding to an occurrence pattern of an event whose probability to occur is higher. Therefore, the symptom information with the larger multiplication result value of the frequency of appearance and the number of occurrences is stored in the symptom information storing section 331 of the terminal device 3. This makes it possible to reduce the possibility of a time lag from the time of occurrence of an event having a predetermined occurrence pattern until the action is performed, and hence to perform an appropriate action as soon as possible. Therefore, for example, even if a failure causing event has occurred, an appropriate action can be performed as soon as possible, so that the influence of occurrence of the failure can be minimized.

The present invention is not limited to the aforementioned embodiments, and various changes and modifications are possible within the scope of the present invention. For example, the structure of symptom information is not limited to the structure including information related to an action in symptom information stored in the symptom database, the information related to the action may be stored in another database in association with each symptom. Further, the even occurrence location is not limited to the terminal device, and the terminal device may be enough as long as it can perform an action corresponding to an event that has occurred.

The invention claimed is:

1. A system with an assistance device connected with a plurality of devices in such a manner to enable data communication with the plurality of devices, the assistance device comprising:
    a storage unit for storing, in association with an occurrence pattern of an event, information related to a plurality of tasks for determining whether a predetermined condition is fulfilled, and an action to be performed by a corresponding device;
    an index value calculating section for calculating an index value for determining a level of probability of the occurrence pattern of the event;
    a determination section for determining whether the calculated index value is larger than a predetermined value; and
    a sending section for sending, to the device to perform the action, the occurrence pattern of the event the index value of which is determined by the determination section to be larger than the predetermined value, and information related to the plurality of tasks and the action corresponding to the occurrence pattern.

2. The system according to claim 1, wherein the sending section sends, to the device to perform the action, information about time to erase the occurrence pattern of the event and the information related to the plurality of tasks and the action corresponding to the occurrence pattern.

3. The system according to claim 1, wherein
    the index value calculating section includes
        condition determination section for determining whether each task fulfills a predetermined condition, and
        counting section for counting the number of tasks determined by the condition determination section not to fulfill the predetermined condition, and
    the determination section includes
        task count determining section for determining whether the number of tasks counted by the counting section is smaller than a predetermined value.

4. The system according to claim 1, wherein
    the index value calculating section includes
        event sequence extracting section for extracting a plurality of event sequences that occur within a given time period starting at a predetermined time,
        pattern acquiring section for acquiring, for each appearance pattern of an event, a frequency of appearance of the appearance pattern and a number of occurrences of each action containing the appearance pattern, and multiplication section for multiplying the acquired frequency of appearance of the appearance pattern by the acquired number of occurrences of the action to calculate an index value.

5. The system according to claim 1, wherein each of the devices includes receiving section for receiving, from the assistance device, the occurrence pattern of the event and information related to the plurality of tasks and the action corresponding to the occurrence pattern, storage section for storing, in a storage unit, the received occurrence pattern of the event and information related to the plurality of tasks and the action corresponding to the occurrence pattern, occurrence pattern specifying section for specifying the occurrence pattern based on information related to the event that has occurred, and action performing section for performing an action based on information related to the action corresponding to the specified occurrence pattern.

6. The system according to claim 5, wherein the receiving section receives information about time to erase the occurrence pattern of the event and the information related to the plurality of tasks and the action corresponding to the occurrence pattern, and the device further includes erasing section for erasing, from the storage unit, the occurrence pattern of the event and the information related to the plurality of tasks and the action corresponding to the occurrence pattern based on the received information about the time to erase.

7. A method executed in a system with an assistance device connected with a plurality of devices in such a manner to enable data communication with the plurality of devices, the assistance device executing the method comprising:

storing, in association with an occurrence pattern of an event, information related to a plurality of tasks for determining whether a predetermined condition is fulfilled, and an action to be performed by a corresponding device;

calculating an index value for determining a level of probability of the occurrence pattern of the event;

determining whether the calculated index value is larger than a predetermined value; and sending, to the device to perform the action, the occurrence pattern of the event the index value of which is determined to be larger than the predetermined value, and information related to the plural tasks and the action corresponding to the occurrence pattern.

8. The method according to claim 7, further comprises sending information about time to erase the occurrence pattern of the event and the information related to the plurality of tasks and the action corresponding to the occurrence pattern.

9. The method according to claim 7, further comprising:

determining whether each task fulfills a predetermined condition, and counting a number of tasks determined by the condition determination section not to fulfill the predetermined condition, and determining whether the number of tasks counted by the counting section is smaller than a predetermined value.

10. The method according to claim 7, further comprising:

extracting a plurality of event sequences that occur within a given time period starting at a predetermined time, acquiring, for each appearance pattern of an event, a frequency of appearance of the appearance pattern and a number of occurrences of each action containing the appearance pattern, and multiplying the acquired frequency of appearance of the appearance pattern by the acquired number of occurrences of the action to calculate an index value.

11. The method according to claim 7, further comprising:

receiving, from the assistance device, the occurrence pattern of the event and information related to the plurality of tasks and the action corresponding to the occurrence pattern, storing, in a storage unit, the received occurrence pattern of the event and information related to the plurality of tasks and the action corresponding to the occurrence pattern, specifying the occurrence pattern based on information related to the event that has occurred, and performing an action based on information related to the action corresponding to the specified occurrence pattern.

12. A computer program product comprising a non-transitory computer usable storage device having program code stored thereon for performing a method, when executed by a system connected with a plurality of devices in such a manner to enable data communication therewith, comprising:

storing, in association with an occurrence pattern of an event, information related to a plurality of tasks for determining whether a predetermined condition is fulfilled, and an action to be performed by a corresponding device;

calculating an index value for determining a level of probability of the occurrence pattern of the event;

determining whether the calculated index value is larger than a predetermined value; and sending, to the device to perform the action, the occurrence pattern of the event the index value of which is determined to be larger than the predetermined value, and information related to the plural tasks and the action corresponding to the occurrence pattern.

13. The product according to claim 12, wherein the method further comprises sending information about time to erase the occurrence pattern of the event and the information related to the plurality of tasks and the action corresponding to the occurrence pattern.

14. The product according to claim 12, wherein the method further comprises:

determining whether each task fulfills a predetermined condition, and counting a number of tasks determined by the condition determination section not to fulfill the predetermined condition, and determining whether the number of tasks counted by the counting section is smaller than a predetermined value.

15. The product according to claim 12, wherein the method further comprises:

extracting a plurality of event sequences that occur within a given time period starting at a predetermined time, acquiring, for each appearance pattern of an event, a frequency of appearance of the appearance pattern and a number of occurrences of each action containing the appearance pattern, and multiplying the acquired frequency of appearance of the appearance pattern by the acquired number of occurrences of the action to calculate an index value.

16. The product according to claim 12, wherein the method further comprises:

receiving, from the assistance device, the occurrence pattern of the event and information related to the plurality of tasks and the action corresponding to the occurrence pattern, storing, in a storage unit, the received occurrence pattern of the event and information related to the plurality of tasks and the action corresponding to the occurrence pattern, specifying the occurrence pattern based on information related to the event that has occurred, and performing an action based on information related to the action corresponding to the specified occurrence pattern.

* * * * *